United States Patent [19]

Gengler

[11] 4,316,750
[45] Feb. 23, 1982

[54] APPARATUS AND METHOD FOR CLEANING A FLUX STATION OF A SOLDERING SYSTEM

[75] Inventor: Robert H. Gengler, Aurora, Ill.

[73] Assignee: Western Electric Company, Inc., New York, N.Y.

[21] Appl. No.: 225,563

[22] Filed: Jan. 16, 1981

[51] Int. Cl.³ .................. B08B 7/04; B05B 15/02
[52] U.S. Cl. .................. 134/18; 118/302; 134/22.12; 134/22.14; 134/22.18; 134/22.19; 134/30; 134/33; 134/57 R; 134/58 R; 134/95; 134/104; 134/113; 228/36; 239/112
[58] Field of Search .................. 134/18, 22.18, 22.19, 134/30, 33, 57 R, 58 R, 95, 104, 113, 22.12, 22.14; 118/74, 302, 323; 427/424; 239/106, 112; 228/33, 36, 37, 223

[56] References Cited

U.S. PATENT DOCUMENTS

| | | | |
|---|---|---|---|
| 2,048,912 | 7/1936 | Ziska et al. | 118/302 |
| 3,373,762 | 3/1968 | Korchak | 239/112 X |
| 3,403,695 | 10/1968 | Hopkins | 239/112 X |
| 3,672,570 | 6/1972 | Scarbrough et al. | 239/112 X |
| 3,786,825 | 1/1974 | Weisner | 134/104 X |
| 4,265,858 | 5/1981 | Crum et al. | 239/112 X |
| 4,285,446 | 8/1981 | Rapp et al. | 239/112 X |

Primary Examiner—Marc L. Caroff
Attorney, Agent, or Firm—J. J. Jordan; J. L. Landis

[57] ABSTRACT

Spray flux apparatus (10) of a soldering system is automatically cleaned by delivery of a predetermined amount of solvent to the apparatus. A control system (50) transmits signals for controlling the delivery of air or solvent through holes (33) in an air manifold (32) located in a flux tank (21). After a predetermined amount of solvent is delivered to the tank (21), the control system (50) signals a solenoid valve (62) to close to stop the flow of solvent to the tank (21) and then signals another solenoid valve (52) to open to allow compressed air to enter the tank (21) to aid in the cleaning of the apparatus (10).

10 Claims, 3 Drawing Figures

APPARATUS AND METHOD FOR CLEANING A FLUX STATION OF A SOLDERING SYSTEM

TECHNICAL FIELD

This invention relates to a purge system and a method for purging a flux station of a soldering system and more particularly to a purge system and method for automatically cleaning the flux station apparatus of a wave soldering machine.

BACKGROUND OF THE INVENTION

During the soldering process of a printed wiring board the wiring surface of the board is coated with a flux prior to application of the solder. The flux, typically a rosin type flux in an alcohol base, helps to prepare the printed wiring board for soldering by cleaning oxides and other contaminants from the wiring surface of the printed wiring board. One of the widely used methods of applying flux to the surface is by spraying the flux on to the surface at a spray flux station. As can be appreciated, the flux applied to the board surface must itself be free of contaminants, and the flux station must be clean if the flux is to properly prepare the surface for soldering.

Presently the flux station of most soldering systems is cleaned on a daily basis. After the flux is drained from the flux station tank, the equipment is manually cleaned by using solvents such as 1,1,1 trichloroethane. However, this method of cleaning is time consuming, and labor intensive resulting in prolonged shut down of the soldering system.

SUMMARY OF THE INVENTION

It is an object of the present invention to provide a method and apparatus for automatically purging the flux station of a soldering system.

Another object of the invention is to provide a method and apparatus for automatically purging the flux station which operates quickly and causes a minimum of station down-time.

With the foregoing and other objects in view, methods and apparatus in accordance with certain features of the invention involve delivery of a predetermined amount of solvent to the flux apparatus through a manifold which extends into the flux tank, and rotating a squirrel cage screen drum through the solvent to clean the screen. In the process, air is blown through the manifold after the predetermined amount of solvent has passed through the manifold, to aid in cleaning the manifold and screen. The apparatus further includes a control system for automatically opening and closing the air and solvent delivery arrangements to the flux tank.

Preferably the solvent delivery arrangement contains a liquid volume-flow meter for measuring a predetermined amount of fluid passing through the arrangement and signaling the control system.

BRIEF DESCRIPTION OF THE DRAWINGS

The above-described and other objects, advantages and features of the invention will be more readily understood from the following detailed description when read in conjunction with the accompanying drawings, wherein.

DETAILED DESCRIPTION

Figure 1:
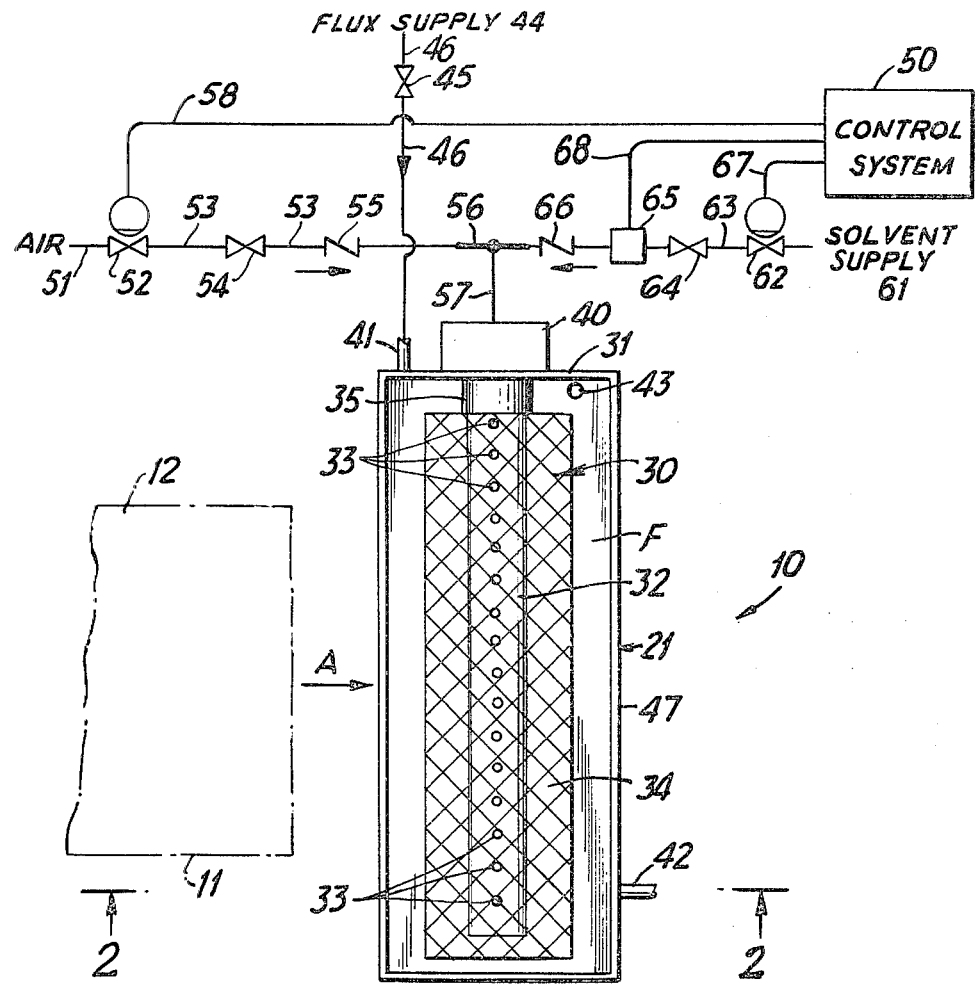
FIG. 1 is a partially diagramatic top view of a purge system in accordance with the invention and including a flux tank.
Figure 2:
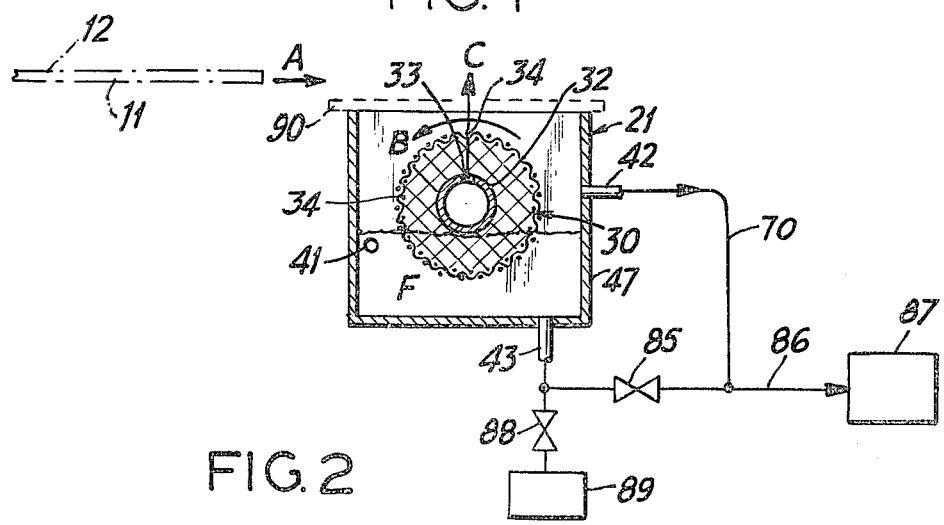
FIG. 2 is a vertical section taken along line 2—2 of FIG. 1 showing the tank and the squirrel cage screen drum.

Referring now in detail to the drawings, and particularly to FIGS. 1-2, there is illustrated a complete flux-station apparatus 10, in accordance with a specific embodiment of the invention, for applying a flux F to a surface 11, which is the wiring or non-component side of a printed wiring board 12, as it passes over apparatus 10 in the direction of arrow A and for automatically cleaning or purging the apparatus 10. A plurality of printed wiring boards 12 are suspended, with the wiring side 11 of each board 12 on which the flux is to be applied facing downward, from any conventional overhead conveyer system which moves the boards in a single file at a known rate of speed and at a preset vertical distance above a tub, or tank 21, containing a bath of liquid flux F. A typical liquid flux F used in this process is a rosin type flux in an alcohol base known commercially as NOR-211 manufactured by the Nassau Recycle Corporation of Gaston, SC. The flux is applied to the wiring side 11 of each board 12 prior to soldering to act as a wetting agent to aid in soldering and to also clean the wiring side 11 by removing oxides and other contaminants from the wiring surface.

A squirrel cage screen drum 30 extends horizontally through tank 21 and is mounted at one end, cantilever style, to a wall 31 to tank 21. Drum 30, which spans almost the entire length of tank 21 and is longer than the width of board 12, as best seen in FIG. 1, comprises a hollow manifold, or air knife 32, rigidly mounted to wall 31 and extending out from wall 31 through the center of drum 30 into tank 21. Hollow manifold 32 has a plurality of holes, or openings, 33 located in its upper surface which faces the lower surface 11 of each board 12 as it passes over manifold 32. Although hollow manifold 32 is rigidly mounted to wall 31 of tank 21, the hollow center section of manifold 32 extends through an aperture in wall 31 for connection to a compressed air input as will be explained in detail below.

Drum 30 also includes a cylindrical wire screen 34 which is rotationally mounted on manifold 32 for movement about the manifold in a counter-clockwise direction as indicated by arrow B in FIG. 2. Wire screen 34 moves through the bath of flux F in tank 21 to pick up liquid flux on the screen mesh so that screen 34 is soaked with a thin film of liquid flux F as it rotates out of the bath and over the plurality of holes 33 in manifold 32. Screen 34 is capable of rotating about rigidly mounted manifold 32 since it is connected to a rotatable collar 35 which is mounted on manifold 32 at wall 31 and which is connected through wall 31 to a motor 40 which, when turned on, rotates collar 35 and attached wire screen 34. Motor 40 is mounted on the outside surface of wall 31 as seen in FIG. 1.

Tank 21 also has three ports or vents 41, 42, 43 as illustrated in FIGS. 1 and 2, through which liquids can flow into and out of tank 21. Liquid flux is introduced into tank 21 from flux supply 44, through valve 45, conduit 46 and vent 41 during the operation of the flux station apparatus 10 when applying flux to printed wiring boards 12. Overflow vent 42 is located approximately half the vertical distance up side wall 47 of tank 21 and remains open during the fluxing operation to prevent flux from overflowing the tank through the manifold 32. The level of the flux bath in tank 21 must be kept below the height of the plurality of openings 33 in hollow manifold 32 so that the liquid flux does not flow into or otherwise clog openings 33. Overflow vent 42, which is located lower than holes 33, prevents liquid flux from entering holes 33 since flux F will pour out of tank 21 through vent or pipe 42 thereby keeping the level of the liquid flux bath below the height of the plurality of openings 33.

Drain vent 43, located on the bottom of tank 30, is normally closed and is opened to drain tank 21 as will be discussed in detail below.

As illustrated in FIG. 1, a control system 50 is interconnected with various valves for controlling the flow of various substances into and out of tank 21. Air flows from supply 51, typically a supply of compressed air, through a solenoid shut-off valve 52, and conduit 53, which includes back-up valve 54 and check valve 55, to the left arm of "T" connector 56 before entering manifold 32 through the stem portion 57 of connector 56 which is connected directly to manifold 32 as seen in FIG. 1. Solenoid shut-off valve 52 is responsive to signals transmitted from control system 50 on electrical leads 58. Conduit 56 can be made of copper or plastic tubing. Back-up valve 54 is a typical manual type valve which can be manually opened or closed in the event valve 52 becomes inoperable. Check valve 55 is a unidirection valve which permits a flow of liquid in only one direction through the valve, in this instance, from left to right. Thus air can flow through check valve 55 from air supply 51 to "T" connector 56, but nothing can flow back through valve 55 from "T" connector 56 to air supply 51.

Solvent flows from solvent supply 61, typically a pressurized system pumped from holding tank, through a solenoid shut-off valve 62, conduit 63, manual back-up valve 64, a liquid-flow meter such as a commercial "Neptune" meter 65, and check valve 66 to the right side of "T" connector 56 before entering manifold 32 through the stem portion 57 of connector 56. Solenoid shut-off valve 62 operates under the control of electrical signals transmitted from control system 50 over electrical leads 67. Back-up valve 64 can be manually operated in the event solenoid valve 62 becomes inoperable. Meter 65 measures the amount of solvent which flows through the meter and signals control system 50 on leads 68 when a predetermined number of gallons have flowed from solvent supply 61 to tank 21. Check valve 66 is a unidirectional valve similar to valve 55 described above. Valve 66 permits flow of solvent from solvent supply 61 to "T" connector 56 and does not allow anything to flow back from "T" connector 56 to supply 61. Meter 65 can be purchased from the Neptune Measurement Co. of Greenwood, S. C. under the name Neptune Type S meter.

Solenoid shut-off valves 52 and 62 are preferably of the type manufactured by the Worcester Controls Corp. of West Boylston, Mass. as the Model A411T-SE/34 valves.

One of the solvents which can be used herein is 1,1,1 trichloroethane, which dissolves the flux upon contact without the need for scrubbing or brushing any of the apparatus 10. Conduit 63 and "T" section 56 are typically made of copper tubing of stainless steel to prevent the solvent from dissolving the conduit and "T" section.

Figure 3:
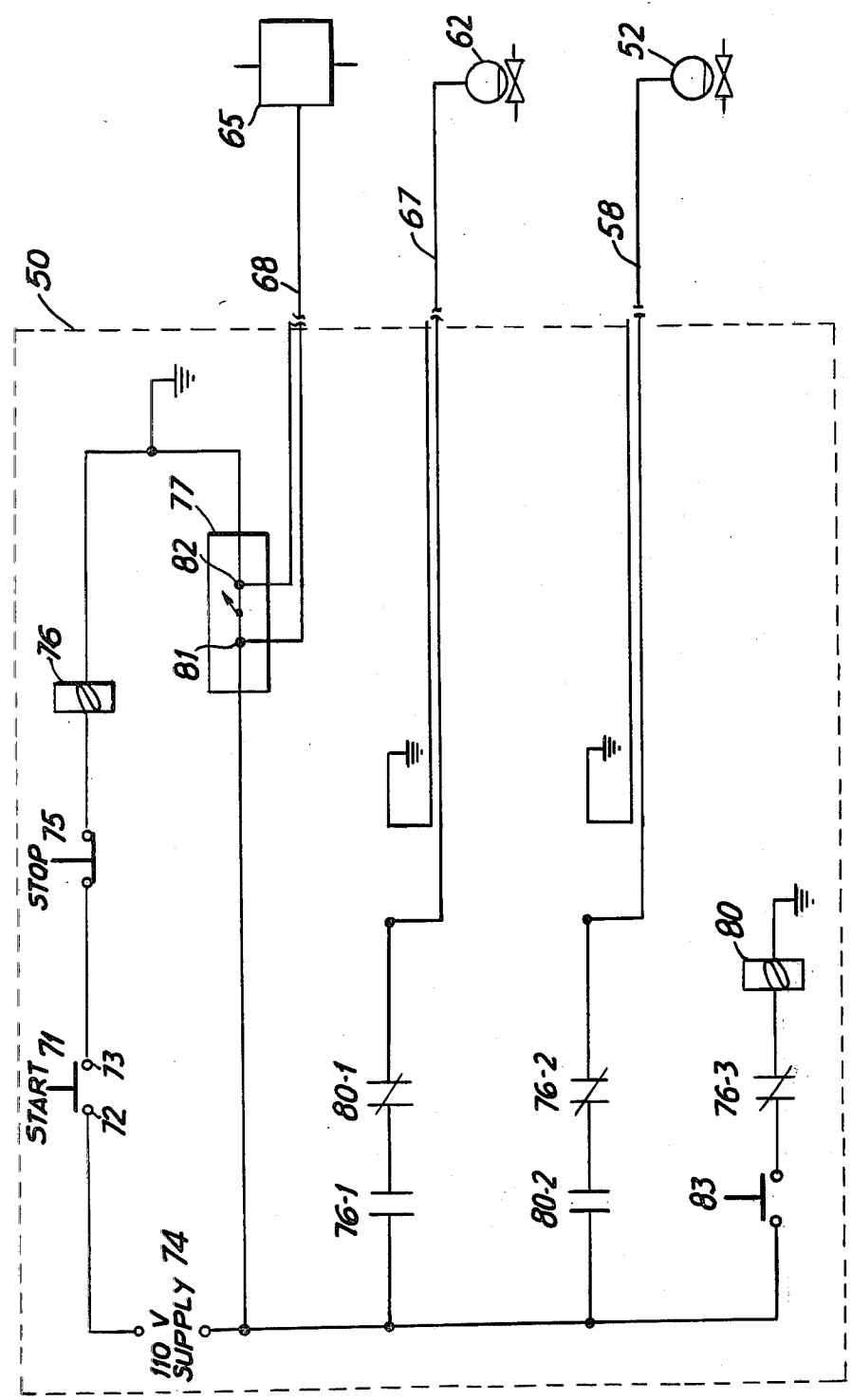
FIG. 3 is a wiring schematic of the circuitry in the control unit.

The electrical circuitry included in a typical control system 50 is illustrated by the circuit shown in FIG. 3. When START switch 71 is pushed, contact is made between points 72 and 73 and current flows from the 110 V supply 74 through START switch 71, STOP switch 75, relay 76, the closed contacts of meter switch 77 back to 110 V supply 74. When this occurs, relay 76 is energized thereby closing normally open relay contact points 76-1 and opening normally closed relay contact points 76-2 and 76-3.

Relay contact points 76-1 are connected in series between the 110 V supply 74, normally closed relay contact points 80-1 (operated by relay 80), and leads 67 to solvent solenoid valve 62 and ground. Thus when relay 76 becomes energized, solvent solenoid valve 62 is energized and turned on.

Normally closed relay contact points 76-2 are connected in series between 110 V supply and normally open contacts 80-2, leads 58 to air solenoid valve 52 and ground. Thus when relay 76 becomes energized, air solenoid valve 52 is deenergized or turned off.

Meter switch 77 which is manufactured by the HELCON Corp., Trinton Falls, N.J., Code AO-423-328-4, is also connected to leads 68 which are connected to liquid-flow meter 65 as seen in FIG. 1. As discussed above, when a predetermined amount of solvent has flown through meter 65, a signal is transmitted over leads 68 to meter switch 77, which will open between points 81 and 82 thereby disconnecting relay 76 from 110 V supply 74. Relay 76 is now deenergized opening contacts 76-1 and closing contacts 76-2 thereby turning off solvent solenoid valve 62.

At this time if switch 83 is operated, relay 80 is connected to 110 V supply 74 and energized thus opening normally closed contacts 80-1 connected to solvent solenoid valve 62 and closing normally open contacts 80-2 connected to air solenoid valve 52. Air solenoid valve 52 is now turned on since it is connected through leads 58, closed contacts 76-2, and 80-2 to 110 V supply 74. It should be noted that normally closed contacts 76-3 are connected in series between relay 80 and 110 volt supply 74 to assure that relay 80 cannot be energized while relay 76 is energized so that solenoid valves 52 and 62 cannot be simultaneously activated.

Relay 76 can be disconnected from 110 volt supply 74 by operating stop switch 75.

SPRAY FLUX CYCLE

Flux station apparatus 10 operates to spray flux onto the wiring side 11 of each printed wiring board 12 which passes over the apparatus in the following manner. Valve 45 is turned on to allow liquid flux F to enter tank 21 from supply 44, which is a sealed unit, through conduit 46 and vent 41. Liquid flux will enter tank 21 until the level of the flux in the tank reaches the top of the vent 41 thus sealing off any air flow back into the sealed flux supply unit 44. When the level of the flux in tank 21 drops below vent tube 41 air is allowed to enter sealed flux supply unit 44 through conduit 46. The volume of air entering flux supply unit 44 displaces an equivalent volume of flux which flows out of sealed unit 44 through conduit 46 and into tank 41 until flux level in tank 41 again reaches the top of vent tube 41. Thus the level of the flux bath in tank 21 is kept constant. In the event the seal is broken on the sealed flux supply unit 44, flux will enter tank 21 and when the flux level reaches overflow vent 42 the flux pours out of vent 42 through conduit 70 to a storage tank.

When the flux level in the tank has reached the top of vent 41, motor 40 is turned on to rotate collar 35 and attached screen 34. As screen 34 is rotated through the flux bath in tank 21, it picks up a thin film of flux; and screen 34, with the thin film of flux, is next rotated up over the plurality of holes 33 in manifold 32 in the direction of arrow B as illustrated in FIG. 2.

At this time switch 83 of control system 50 as seen in FIG. 3 is closed thereby operating relay 80 and transmitting signals on electrical leads 58 and 67 to open air solenoid valve 52 and close solvent solenoid valve 62 respectively as described above. Manually operated valves 54 and 64 of FIG. 1 are normally kept open. Air, from compressed air supply 51, enters manifold 32 from conduit 53, check valve 55, connector 56 and stem 57 to egress in an upward direction from the plurality of holes 33 in manifold 32. As the air blows up from holes 33 it encounters the film of flux on screen 34 which is rotating directly above the holes and blows the thin film of flux off the screen as a fine spray in an upward direction as represented by arrow C in FIG. 2. Solvent is prevented from entering tank 21 since solenoid valve 62 is closed. Air cannot enter solvent supply 61 because of check valve 66.

The conveyer system on which a plurality of printed wiring boards 12 are resting has been turned on to move the boards 12 in a single file over apparatus 10. As a board 12 moves over apparatus 10, holes 33 are spraying the flux in an upward direction to coat the lower wiring surface 11 of each board 12 with flux spray. Since screen 34 enters the flux bath after passing over holes 33 and has a thin film of flux coated on it prior to again passing over holes 33, a continuous flux spray is atomized up onto the lower surface 11 of each passing board 12 while flux station apparatus 10 is in operation Some conveyor systems have arrangements for sensing (photo-electric devices not shown) when a board 12 is directly over holes 33 and signals control system 50 when this occurs. Control system 50 then signals solenoid valve 52 to open to allow air to blow through holes 33 only when a board 12 is directly over holes 33.

Thus apparatus 10 operates to spray flux onto the wiring side 11 of each printed wiring board 12 as it passes over the apparatus 10.

CLEANING CYCLE

Because the flux sprayed onto the surface 11 of printed wiring board 12 acts as a cleaning agent, it is vital that the flux bath contained in tank 21 and the flux station apparatus 10 be free of contaminants. However, during the operation of the flux station apparatus 10 contaminants can enter tank 21 from the conveyor system and the substrates 12 which pass over the tank. Additionally, holes 33 in manifold 32 can become clogged with flux and are thus impeded from blowing an effective spray of flux onto passing printed wiring boards 12. Another problem is that the flux builds up on the screen 34 as it rotates through the flux bath until the flux caught on the screen is too thick to be blown off by the air being emitted by holes 33. To prevent these problems from occurring, flux station apparatus 10 is shut down at least once a day and thoroughly cleaned.

At the start of the cleaning cycle the conveyor system is turned off to stop printed wiring boards 12 from moving over apparatus 10. Motor 40 is also turned off, thus immobilizing collar 35 and screen 34. Manual valve 45 is closed to stop the flow of flux from flux supply 44 to tank 21, and manual valve 85 is opened to allow the flux contained in tank 21 to drain, through conduit 86, to storage tank 87. Valve 88 is kept closed at this time. It should be noted that although valves 45, 85 and 88 are shown herein as manually operated valves, solenoid valves, similar to those shown as solenoid valves 52 and 62 which are controlled by control system 50, can be used in place of manual valves 45, 85 and 88. The flux contained in holding tank 87 is typically cleaned by running it through a filtering system for reuse in the flux supply 44. Additionally, switch 83, FIG. 3, is opened to deenergize relay 80 so that air solenoid valve 52 is turned off.

After the flux contained in tank 21 has been drained through drain vent 43, valve 85 is closed. At this time, start switch 71 (FIG. 3) of control system 50 is depressed and signals are transmitted over leads 58 and 67 to close air solenoid valve 52 and open solvent solenoid valve 62 respectively as described above. When this is accomplished air from air supply 51 can no longer be introduced into manifold 32 but, rather, solvent from solvent supply 61 is being pumped through open solenoid valve 62, open valve 64, conduit 63, meter 65, check valve 66, "T" section 56, stem 57 to manifold 32 and out of holes 33. Motor 40 is again turned on and as screen 34 rotates through the solvent pouring from holes 33 it is purged or cleaned of any flux which may be stuck to screen 34. Additionally, the solvent cleans flux from the holes 33, the outer surface of manifold 32 and the inner surfaces of tank 21. When the number of gallons of solvent which have flowed through meter 65 equals a predetermined number, meter 65 transmits a signal over leads 68 to meter switch 77 (FIG. 3) of control system 50. Meter switch 77 opens between points 81-82 of FIG. 3 to deenergize relay 76 which opens relay contact 76-1 to deenergize solvent solenoid valve 62 which closes. Thus the amount of solvent contained in tank 21 can be limited to a specific number of gallons sufficient to effectively clean tank 21 and drum 30, but insufficient to flow out of overflow vent 42 and into storage chamber 87 thereby contaminating the liquid flux contained therein.

After drum 30 has been rotating through the solvent bath contained in tank 21 so that drum 30 is clean (typically for about 5 minutes), switch 83 (FIG. 3) of control system 50 is closed to energize relay 80 which signals air solenoid valve 52 to open allowing air to be forced into manifold 32 and out through openings 33 as described above. This is done to purge any remaining solvent from manifold 32 and holes 33 while also blowing solvent from screen 34 as it rotates over the holes 33. A lid 90 can be placed on top of tank 21 as illustrated by the dotted lines in FIG. 2 to prevent the solvent from being sprayed up and out of tank 21 during this portion of the operation.

Valve 88 is opened at this time to drain the solvent bath from tank 21 through vent 43 into holding tank 89. After the solvent is drained from tank 21, valve 88 is closed and the purged flux station apparatus 10 is now ready to again begin a Spray Flux Cycle as described above.

It will also be apparent that one skilled in the art may make various modifications and changes to the methods and apparatus disclosed herein without departing from the spirit and scope of this invention.

What is claimed is:

1. An improved cleaning system for a spray fluxing apparatus of the type including a tank for holding a bath of flux, a supply of compressed air, a manifold having a number of holes appearing therein, means for rotating a thin film of flux over the holes, and means for delivering the compressed air through the holes to blow the thin film of flux appearing over the holes in a spray, wherein the improvement comprises:

means for delivering a predetermined amount of solvent through the holes in the manifold into the tank; and control means for automatically controlling the compressed air delivering means and the solvent delivering means, such that, after the control means has allowed a predetermined amount of solvent to be delivered to the previously empty tank through the holes in the manifold, the solvent supply delivering means is closed, the compressed air supply delivering means is opened, and the rotating means is rotated through solvent to clean the flux spraying apparatus as it comes in contact with the solvent and the compressed air.

2. An improved cleaning system as recited in claim 1 wherein the solvent delivery means comprises a liquid volume flow meter for measuring a predetermined amount of solvent flowing through the meter and for signaling the control means.

3. An improved cleaning system as recited in claim 2 wherein the rotating means comprises a squirrel cage screen which rotates about the manifold to place a thin film of liquid above the holes in the manifold after the screen has rotated through the liquid contained in the tank.

4. An improved cleaning system as recited in claim 1 wherein the compressed air delivering means and the solvent delivering means each comprises a solenoid shut-off valve responsive to signals transmitted by the control means.

5. An improved cleaning system as recited in claim 1 wherein the system further comprises venting apparatus for emptying the tank of either flux or solvent into separate storage containers.

6. An improved cleaning system as recited in claim 1 wherein the solvent comprises 1,1,1 trichloroethane.

7. A method of cleaning a flux spraying station of the type including a tank for holding a bath of flux, a manifold having a plurality of holes connectable to a supply of compressed air, a squirrel cage screen for rotating a thin film of liquid over the holes, and means for rotating the screen, the method comprising the steps of:

(a) emptying the bath of flux from the tank;

(b) delivering a predetermined amount of a solvent into the tank through the plurality of holes in the manifold;

(c) rotating the squirrel cage screen through the solvent to clean the screen;

(d) stoping the delivery of the solvent to the tank after a predetermined amount of solvent has been delivered; and then (e) delivering compressed air to the tank through the holes in the manifold to aid in cleaning the screen as it passes over the holes.

8. A method as recited in claim 7 further comprising the steps of:

emptying the solvent in the tank after the screen, manifold and tank are clean.

9. A method as recited in claim 7 wherein the compressed air and the solvent are automatically delivered to the manifold under the control signals generated by a control unit.

10. A method as recited in claim 9 wherein the solvent is delivered through a liquid volume flow meter which transmits a signal to the control unit when a predetermined amount of solvent has passed through the meter.

* * * * *